United States Patent Office 2,812,345
Patented Nov. 5, 1957

1

2,812,345
1,1-DICYANO BETATHIOETHERS AND METHOD OF PREPARATION

Jerome C. Westfahl, Cuyahoga Falls, Ohio, assignor to The B. F. Goodrich Company, New York, N. Y., a corporation of New York No Drawing. Application March 8, 1956, Serial No. 570,213

14 Claims. (Cl. 260—465)

This invention relates to new thioethers and to a method for preparing novel thioesters having the formula R—S—CH$_2$CH(CN)$_2$ by reacting a homopolymer of 1,1-dicyanoethylene with a thiol in the presence of an alkaline catalyst and more particularly pertains to a method for preparing thioethers of the type described by reacting a homopolymer of 1,1-dicyanoethylene with an alkyl, aryl or aralkyl thiol, in the presence of an alkaline catalyst. In the formula R—S—CH$_2$CH(CN)$_2$ R represents an alkyl, aryl and aralkyl group.

Monomeric 1,1-dicyanoethylene cannot be reacted with mercaptans in the presence of an alkaline catalyst because primary amines, secondary amines, ammonia, alkali or alkaline earth metal hydroxides, oxides and carbonates and the mercaptans or their alkali metal salts all cause the monomer to homopolymerize and thereby make the monomer unavailable for reaction. It is therefore quite surprising that the homopolymer will react to produce the thioethers of the formula R—S—CH$_2$CH(CN)$_2$.

The homopolymer of 1,1-dicyanoethylene that can be employed can vary greatly in molecular weight from one having at least 3 1,1-dicyanoethylene units to one in which the intrinsic viscosity of a .4% solution in dimethylformamide is about 3.52. The low molecular weight polymers can be prepared by adding an alcohol to 1,1-dicyanoethylene monomer. High molecular weight homopolymers can be prepared by polymerizing monomeric 1,1-dicyanoethylene in the presence of a diazo or an ionic catalyst. The intrinsic viscosity of the polymers measured at a concentration of 0.4 gram of polymer in 100 ml. dimethyl formamide at a temperature of 25° C. can vary between 0.005 or less and 3.52 or above. The homopolymer with an intrinsic viscosity of .052 is calculated to have an average of about 6

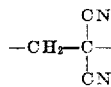

units per mole.

The homopolymer of vinylidene cyanide can be represented graphically by the structural formula

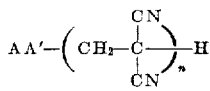

wherein $n$ is an integer of at least 3, A is H or an alkyl group and A' is O or N (i. e. polymers prepared by using H$_2$O, alcohols, NH$_3$ or amide). In other words, AA' in combination define a chain initiating group.

The mercaptans which can be reacted include the alkyl mercaptans having from 1 to 20 carbon atoms or more. These include methane thiol, ethane thiol, propane thiol, the butane thiols, pentane thiols, hexane thiols, octane thiols, nonane thiols, decane thiols, dodecane thiols, hexadecane thiols, octadecane thiols, and eicosane thiols. Representative aralkyl thiols include benzyl thiol, 2-phenyl propane thiol, 3-phenyl propane thiol, 2-phenyl butane thiol, 3-phenyl-n-butane thiol, 4-phenyl-n-butane thiol, the 2,3,4 and 5-phenyl pentane thiols, the monophenyl hexane thiols, and the monophenyl substituted derivatives of the aliphatic thiols mentioned above. The —SH group can be on any alkyl carbon atom in the chain.

2

Typical aryl thiols are thiophenol, 2-thionaphthol, 1-thionaphthol, o,m and p-thiocresols, xylenethiols, and the ethyl benzene thiols.

The alkaline catalysts include alkali metal and alkaline earth metal hydroxides, alkali metal oxides, carbonates and bicarbonates, ammonium hydroxides, secondary amines such as piperidine, tertiary amines such as pyridine, mixtures of amines, alkali metals, and alkali metal alkoxides. With long chain or high molecular weight thiols which are weakly acidic it is usually preferable to employ a strongly basic catalyst. The more strongly acidic thiols react even in the presence of a weakly basic catalyst.

The reaction is exothermic and for that reason it is preferably carried out in an inert diluent to aid in the dissipation of the heat which is generated. The inert diluents include aromatic liquid hydrocarbons and liquid halogenated derivatives thereof in which the halogen is attached to a carbon atom of the aromatic nucleus. Typical diluents are benzene, toluene, xylene, trimethyl benzene, ethyl benzene chlorobenzene, bromobenzene, chlorotoluene, chloroxylene and the like.

The temperature at which the reaction proceeds can vary over a fairly wide range of from about 0° C. to 100° C. or as high as the reflux temperature of the reaction mixture if the diluents are high boiling liquid aromatic hydrocarbons or liquid, halogenated derivatives thereof. The preferred reaction temperature, however, is 30–80° C. This latter temperature range is readily attained by heating the mixture on a steam bath.

The reaction can be effected at atmospheric pressure, in a partial vacuum or at elevated pressures. The pressure conditions are largely dictated by the physical characteristics of the thiol. Thus, if methanethiol or ethanethiol are among the reactants it is preferred to carry out the reaction under super-atmospheric pressure to prevent loss of the thiol by evaporation. Thiols of higher molecular weight can readily be reacted in benzene at temperatures of about 50–60° C., by using a reflux condenser to return to the reaction mixture any thiol that volatilizes.

The proportion of reactants is not critical, but it is preferred to have approximately equivalent quantities of each reactant.

There is no preference as to the order of addition of the ingredient into the mixture and all of the ingredients can be mixed at one time or they can be proportionated if desired.

The examples which follow are intended to be illustrative of, but not limitations on the invention. All parts are by weight unless otherwise specified.

EXAMPLE I

A low molecular weight polymer of 1,1-dicyanoethylene was prepared by adding ethanol to a solution of the monomer in benzene. The polymer was filtered and washed several times with benzene, and dried.

A reaction mixture was prepared by adding 40 ml. of benzene and 3.9 grams of the 1,1-dicyanoethylene homopolymer into a 3 necked flask, equipped with a reflux condenser, a mechanical stirrer and a thermometer. To this slurry were added 6.21 parts of benzyl thiol

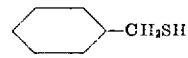

and 3.96 parts of pyridine. The mixture became warm within about three minutes and turned brownish in color. Then the mixture was placed on a steam bath and held at a temperature of 50–60° C. for about 30 minutes. The reaction mixture was cooled, 50 ml. of water and 5 ml. of concentrated HCl were added and then the entire mixture was diluted with 100 ml. of hexane at which time an emulsion formed. The mixture was filtered to break the emulsion.

The organic layer of the filtrate was separated from aqueous layer. On cooling pale yellow crystals separated. The crystals were separated by filtration and dried. The melting point of the

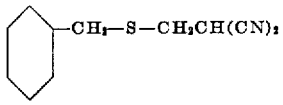

was 42–47° C. On recrystallization from an ethanol-water mixture, the purified thioether had a melting point of 47.5–48.5° C. The yield of crude thioether was 41.7%.

On analysis the compound had the following elemental composition:

|  | C | H | N | S |
|---|---|---|---|---|
| Calculated for $C_{11}H_{10}N_2S$ | 65.32 | 4.98 | 13.85 | 15.85 |
| Found | 65.47 | 4.99 | 13.90 / 13.85 | 15.96 / 15.90 |

In order to prove the structure of the compound, a portion thereof was hydrolyzed by refluxing for 16 hours in an excess of concentrated HCl. The hydrolysis product under these conditions proved to be

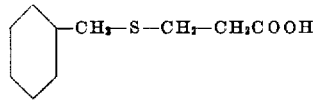

It had a melting point of 81.2–82° C. The melting point for this compound reported by B. Holmberg (C. A. 35, 2114⁶) was 82–84° C. The betathiobenzyl propionic acid was then oxidized with aqueous potassium permanganate to form

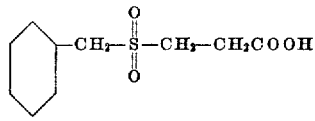

This compound was found to have a melting point of 177–178° C. which is identical with that reported for the betabenzyl sulfonyl propionic acid by Rappaport et al. in J. A. C. S. 69, 693 (1947).

EXAMPLE II

The equipment employed in Example I was also used in this example. A slurry of 4.4 parts of a low molecular weight homopolymer of 1,1-dicyanoethylene in 40 ml. benzene was prepared. To this mixture were added 10.12 parts of n-dodecyl mercaptan and 3.96 parts of pyridine. The mixture was then heated on a water bath at 50–60° C. for about 35 minutes. Then the reaction mixture was cooled in an ice bath. The mixture was acidified with 5 ml. of concentrated HCl and 5 ml. of water. At this stage an emulsion formed, but was broken by filtration. The filtrate was transferred to a separating funnel and the aqueous layer was separated, washed several times with benzene and the benzene was combined with that from main reaction mixture. The benzene fraction was dried with anhydrous magnesium sulfate, filtered, and then the benzene was removed by vacuum distillation. A yellow viscous liquid remained. On standing, the liquid crystallized, giving 13.90 grams of the desired thioether. The crystals were dissolved in hexane and recrystallized therefrom to give 10.5 grams of pale yellow crystals having a melting point of 37–39° C. The yield of crude $$C_{12}H_{25}-S-CH_2CH(CN)_2$$

was 74.8%.

EXAMPLES III–XI

In the following table are listed the thiols, catalysts and compounds which can be formed by reacting a mercapto compound with a homopolymer of 1,1-dicyanoethylene in the presence of an alkaline catalyst in accordance with the procedure described above. The methane thiol and ethane thiol are reacted under pressure because of their volatility.

*Table I*

| Thiol | Catalyst | End Product |
|---|---|---|
| $CH_3SH$ | Pyridine | $CH_3-S-CH_2CH(CN)_2$ |
| $C_2H_5SH$ | Piperidine | $C_2H_5-S-CH_2CH(CN)_2$ |
| $n-C_{10}H_{21}SH$ | $NaOCH_3$ | $C_{10}H_{21}-S-CH_2CH(CN)_2$ |
| $n-C_{18}H_{37}SH$ | Pyridine | $n-C_{18}H_{37}-S-CH_2CH(CN)_2$ |
| phenyl-$CH_2CH_2SH$ | Pyridine | phenyl-$CH_2CH_2-S-CH_2CH(CN)_2$ |
| phenyl-SH | $NaOCH_3$ | phenyl-$SCH_2CH(CN)_2$ |
| (methylphenyl)-SH | Pyridine | (methylphenyl)-$SCH_2CH(CN)_2$ |
| (methylphenyl)-SH | NaOH | (methylphenyl)-$S-CH_2CH(CN)_2$ |
| naphthyl-SH | NaOH | naphthyl-$S-CH_2CH(CN)_2$ |

All of the 1,1-dicyano thioethers described can be converted to compounds having the generic formula $$R\text{—}SO_2\text{—}CH_2CH(CN)_2$$

by oxidation with dilute $HNO_3$ or aqueous potassium permanganate or aqueous hydrogen peroxide. These sulfonyl compounds can be acid hydrolyzed to carboxy sulfonyl compounds with the structure

These latter compounds are good surface-active agents. R in the above formulas has the same designation as previously indicated.

If a surface-active agent which is less sensitive to ions is desired the $R\text{—}S\text{—}CH_2CH(CN)_2$ compounds can be hydrolyzed in strong aqueous sulfuric acid at low temperatures to form compounds having the —CN groups converted to amide groups. This hydrolysis can be effected either before or after oxidation of the ether linkage to a sulfonyl group. The diamide compounds have the generic structure

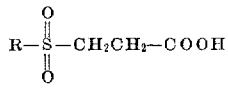

The dicyano compounds of this invention can also be converted to malonic acids by careful hydrolysis of both —CN groups to carboxyl groups. The dicyano compounds can also be converted to mercury, copper and silver salts of the structure

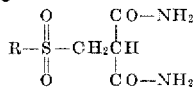

in which $n$ is an integer equal to the valence of M and M is mercury, silver or copper. These salts are good fungicides.

The metal salts can be prepared by reacting the dicyano compound with a water or organic solvent soluble mercuric, silver or cupric salt, such as the nitrates, under alkaline conditions in a liquid diluent, such as ethanol.

Although I have described my invention by reference to specific examples it shall be obvious to those skilled in the art that numerous variations in proportions, reaction ingredient and reaction conditions are possible without departing from the spirit and scope of the claims appended hereto.

I claim:
1. Compound having the structure

$$R\text{—}S\text{—}CH_2CH(CN)_2$$

in which R is selected from the class consisting of alkyl groups having from 1 to 20 carbon atoms, arlower alkyl groups and monocyclic and fused bicyclic aryl groups.

2.
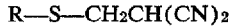

3. $CH_3(CH_2)_{10}CH_2\text{—}S\text{—}CH_2CH(CN)_2$.
4. $CH_3\text{—}S\text{—}CH_2CH(CN)_2$.
5.
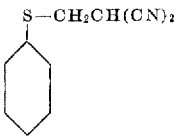

6.
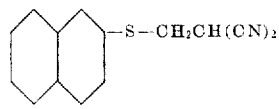

7. A method of preparing 1,1-dicyanoethyl-betathioethers comprising reacting in an inert diluent in the presence of an alkaline catalyst a compound of the structure R—SH in which R is selected from the class consisting of alkyl groups having from 1 to 20 carbon atoms, arlower alkyl groups and monocyclic and fused bicyclic aryl groups with a homopolymer of 1,1-dicyanoethylene.

8. The method of claim 7 in which the homopolymer of 1,1-dicyanoethylene has an intrinsic viscosity measured at 25° C. with .4 gram of polymer dissolved in 100 ml. dimethyl formamide of from about .005 to about 3.52.

9. The method of claim 7 in which the thiol is

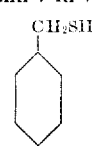

10. The method of claim 7 in which the thiol is $$CH_3(CH_2)_{11}SH$$

11. The method of claim 7 in which the thiol is thiophenol.

12. The method of claim 7 in which the thiol is methane thiol and the reaction is carried out under pressure greater than that of the atmosphere.

13. The method of claim 7 in which the alkaline catalyst is an alkali metal hydroxide.

14. The method of claim 7 in which the catalyst is pyridine.

References Cited in the file of this patent
UNITED STATES PATENTS

| | | |
|---|---|---|
| 2,413,917 | Harman | Jan. 7, 1947 |
| 2,501,226 | Langkammerer et al. | Mar. 21, 1950 |

OTHER REFERENCES

Westfahl et al.: Jour. Amer. Chem. Soc., vol. 76, pp. 1076–79 (1954).

U. S. DEPARTMENT OF COMMERCE
PATENT OFFICE
CERTIFICATE OF CORRECTION

Patent No. 2,812,345                                November 5, 1957

Jerome C. Westfahl

It is hereby certified that error appears in the printed specification of the above numbered patent requiring correction and that the said Letters Patent should read as corrected below.

Column 1, line 12, for "thioesters" read --thioethers--.

Signed and sealed this 11th day of March 1958.

(SEAL)
Attest:
KARL H. AXLINE

Attesting Officer

ROBERT C. WATSON
Commissioner of Patents